US 6,574,596 B2

(12) United States Patent
Bi et al.

(10) Patent No.: US 6,574,596 B2
(45) Date of Patent: *Jun. 3, 2003

(54) VOICE RECOGNITION REJECTION SCHEME

(75) Inventors: Ning Bi, San Diego, CA (US); Chienchung Chang, San Diego, CA (US); Harinath Garudadri, San Diego, CA (US); Andrew P. Dejaco, San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,513

(22) Filed: Feb. 8, 1999

(65) Prior Publication Data

US 2002/0055841 A1 May 9, 2002

(51) Int. Cl.[7] .............................................. G10L 15/04
(52) U.S. Cl. ....................... 704/249; 704/252; 704/238; 704/240; 704/243; 704/246; 704/254
(58) Field of Search ................................. 704/252, 253, 704/254, 256, 255, 246, 243, 244, 240, 236, 238, 241, 242, 249; 706/12; 379/88.02

(56) References Cited

U.S. PATENT DOCUMENTS

| 4,567,606 A | | 1/1986 | Vensko et al. ................. 381/43 |
| 4,593,367 A | * | 6/1986 | Slack et al. .................... 706/12 |
| 4,731,811 A | | 3/1988 | Dubus |
| 4,827,520 A | | 5/1989 | Zeinstra |
| 4,961,229 A | | 10/1990 | Takahashi .................... 381/42 |
| 4,991,217 A | | 2/1991 | Garrett et al. ................ 381/43 |

(List continued on next page.)

FOREIGN PATENT DOCUMENTS

| EP | 0108354 | 5/1984 | ........... G06F/15/16 |
| EP | 0534410 | 3/1993 | ............ G10L/5/00 |
| EP | 0651372 | 5/1995 | |
| EP | 0867861 | 9/1998 | |

OTHER PUBLICATIONS

Schwartz et al., ("The N-best algorithms: an efficient and exact procedure finding the N most likely sentence hypothesis", ICASSP-90., 1990 International Conference Acoustics, Speech, and Signal Processing, Apr. 1990, vol. 1, pp. 81–84).*

(List continued on next page.)

Primary Examiner—Vijay Chawan
(74) Attorney, Agent, or Firm—Philip R. Wadsworth; Charles D. Brown; George C. Pappas

(57) ABSTRACT

A voice recognition rejection scheme for capturing an utterance includes the steps accepting the utterance, applying an N-best algorithm to the utterance, or rejecting the utterance. The utterance is accepted if a first predefined relationship exists between one or more closest comparison results for the utterance with respect to a stored word and one or more differences between the one or more closest comparison results and one or more other comparison results between the utterance and one or more other stored words. An N-best algorithm is applied to the utterance if a second predefined relationship exists between the one or more closest comparison results and the one or more differences between the one or more closest comparison results and the one or more other comparison results. The utterance is rejected if a third predefined relationship exists between the one or more closest comparison results and the one or more differences between the one or more closest comparison results and the one or more other comparison results. One of the one or more other comparison results may advantageously be a next-closest comparison result for the utterance and another store word. The first, second, and third predefined relationships may advantageously be linear relationships.

40 Claims, 2 Drawing Sheets

U.S. PATENT DOCUMENTS

| | | | |
|---|---|---|---|
| 5,012,518 A | | 4/1991 | Liu et al. ..................... 381/42 |
| 5,040,212 A | | 8/1991 | Bethards ...................... 381/41 |
| 5,054,082 A | | 10/1991 | Smith et al. .................. 381/42 |
| 5,109,509 A | | 4/1992 | Katayama et al. .......... 395/600 |
| 5,146,538 A | | 9/1992 | Sobti et al. ..................... 395/2 |
| 5,231,670 A | | 7/1993 | Goldhor et al. ............... 381/43 |
| 5,280,585 A | | 1/1994 | Kochis et al. .............. 395/275 |
| 5,321,840 A | | 6/1994 | Ahlin et al. ................. 395/700 |
| 5,325,524 A | | 6/1994 | Black et al. ................. 395/600 |
| 5,371,901 A | | 12/1994 | Reed et al. ..................... 455/69 |
| 5,390,278 A | * | 2/1995 | Gupta et al. ................. 704/243 |
| 5,414,796 A | | 5/1995 | Jacobs et al. ................ 395/2.3 |
| 5,579,436 A | * | 11/1996 | Chou et al. ................. 704/244 |
| 5,606,644 A | * | 2/1997 | Chou et al. ................. 704/243 |
| 5,717,826 A | * | 2/1998 | Setlur et al. ................ 704/252 |
| 5,729,656 A | * | 3/1998 | Nahamoo et al. ........... 704/254 |
| 5,806,029 A | * | 9/1998 | Buhrke et al. .............. 704/244 |
| 5,819,221 A | * | 10/1998 | Kondo et al. ................ 704/255 |
| 5,912,949 A | * | 6/1999 | Chan et al. ............... 379/88.02 |
| 5,999,902 A | * | 12/1999 | Scahill et al. ................ 704/240 |

OTHER PUBLICATIONS

Deshmukh et al., ("Automated generation of N–best pronunciations of proper nouns", 1996 IEEE International Conference on Acoustics, Speech, and Signal Processing, 1996, ICASSP–96 Conference Proceedings, May 1996, vol. 1, pp. 283–286).*

1978 Digital Processing of Speech Signals, "Linear Predictive Coding of Speech", Rabiner et al., pp. 396–453, 1978.

1989 IEEE, "Efficient Encoding of Speech LSP Parameters Using the Discrete Cosine Transformation", Farvardin et al., pp. 168–171.

* cited by examiner

VOICE RECOGNITION REJECTION SCHEME

BACKGROUND OF THE INVENTION

I. Field of the Invention

The present invention pertains generally to the field of communications, and more specifically to voice recognition systems.

II. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. A voice recognizer typically comprises an acoustic processor, which extracts a sequence of information-bearing features, or vectors, necessary to achieve VR of the incoming raw speech, and a word decoder, which decodes the sequence of features, or vectors, to yield a meaningful and desired output format such as a sequence of linguistic words corresponding to the input utterance. To increase the performance of a given system, training is required to equip the system with valid parameters. In other words, the system needs to learn before it can function optimally.

The acoustic processor represents a front-end speech analysis subsystem in a voice recognizer. In response to an input speech signal, the acoustic processor provides an appropriate representation to characterize the time-varying speech signal. The acoustic processor should discard irrelevant information such as background noise, channel distortion, speaker characteristics, and manner of speaking. Efficient acoustic processing furnishes voice recognizers with enhanced acoustic discrimination power. To this end, a useful characteristic to be analyzed is the short time spectral envelope. Two commonly used spectral analysis techniques for characterizing the short time spectral envelope are linear predictive coding (LPC) and filter-bank-based spectral modeling. Exemplary LPC techniques are described in U.S. Pat. No. 5,414,796, which is assigned to the assignee of the present invention and fully incorporated herein by reference, and L. B. Rabiner & R. W. Schafer, *Digital Processing of Speech Signals* 396–453 (1978), which is also fully incorporated herein by reference.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. And a hands-free car-kit system would additionally permit the driver to maintain both hands on the steering wheel during call initiation.

Speech recognition devices are classified as either speaker-dependent or speaker-independent devices. Speaker-independent devices are capable of accepting voice commands from any user. Speaker-dependent devices, which are more common, are trained to recognize commands from particular users. A speaker-dependent VR device typically operates in two phases, a training phase and a recognition phase. In the training phase, the VR system prompts the user to speak each of the words in the system's vocabulary once or twice so the system can learn the characteristics of the user's speech for these particular words or phrases. Alternatively, for a phonetic VR device, training is accomplished by reading one or more brief articles specifically scripted to cover all of the phonemes in the language. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords. For example, if the name "John" were one of the trained names, the user could initiate a call to John by saying the phrase "Call John." The VR system would recognize the words "Call" and "John," and would dial the number that the user had previously entered as John's telephone number.

The throughput of a VR system may be defined as the percentage of instances that a user goes through a recognition task successfully. A recognition task typically comprises multiple steps. For example, in voice dialing with a wireless telephone, the throughput refers to the average percentage of times that a user completes a telephone call successfully with the VR system. The number of steps necessary to achieve a successful telephone call with VR can vary from one call to another. In general, the throughput of a VR system depends mainly on two factors, the recognition accuracy of the VR system, and the human-machine interface. A human user's subjective perception of VR system performance is based on throughput. Thus, there is a need for a VR system with high recognition accuracy and an intelligent human-machine interface to increase throughput.

SUMMARY OF THE INVENTION

The present invention is directed to a VR system with high recognition accuracy and an intelligent human-machine interface to increase throughput. Accordingly, in one aspect of the invention, a method of capturing an utterance in a voice recognition system advantageously includes the steps of accepting the utterance if a first predefined relationship exists between at least one comparison result for the utterance with respect to a stored word and at least one difference between the at least one comparison result and at least one other comparison result between the utterance and at least one other stored word; applying an N-best algorithm to the utterance if a second predefined relationship exists between the at least one comparison result and the at least one difference between the at least one comparison result and the at least one other comparison result; and rejecting the utterance if a third predefined relationship exists between the at least one comparison result and the at least one difference between the at least one comparison result and the at least one other comparison result.

In another aspect of the invention, a voice recognition system advantageously includes an acoustic processor configured to extract speech parameters from digitized speech samples of an utterance; and a processor coupled to the acoustic processor and configured to (1) accept the utterance if a first predefined relationship exists between at least one comparison result for the utterance with respect to a stored word and at least one difference between the at least one comparison result and at least one other comparison result between the utterance and at least one other stored word, (2)

apply an N-best algorithm to the utterance if a second predefined relationship exists between the at least one comparison result and the at least one difference between the at least one comparison result and the at least one other comparison result, or (3) reject the utterance if a third predefined relationship exists between the at least one comparison result and the at least one difference between the at least one comparison result and the at least one other comparison result.

In another aspect of the invention, a voice recognition system advantageously includes means for accepting an utterance if a first predefined relationship exists between at least one comparison result for the utterance with respect to a stored word and at least one difference between the at least one comparison result and at least one other comparison result between the utterance and at least one other stored word; means for applying an N-best algorithm to the utterance if a second predefined relationship exists between the at least one comparison result and the at least one difference between the at least one comparison result and the at least one other comparison result; and means for rejecting the utterance if a third predefined relationship exists between the at least one comparison result and the at least one difference between the at least one comparison result and the at least one other comparison result.

In another aspect of the invention, a voice recognition system advantageously includes means for extracting speech parameters from digitized speech samples of an utterance; and means for (1) accepting the utterance if a first predefined relationship exists between at least one comparison result for the utterance with respect to a stored word and at least one difference between the at least one comparison result and at least one other comparison result between the utterance and at least one other stored word, (2) applying an N-best algorithm to the utterance if a second predefined relationship exists between the at least one comparison result and the at least one difference between the at least one comparison result and the at least one other comparison result, or (3) rejecting the utterance if a third predefined relationship exists between the at least one comparison result and the at least one difference between the at least one comparison result and the at least one other comparison result.

DETAILED DESCRIPTION OF THE PREFERRED EMBODIMENTS

Figure 1:
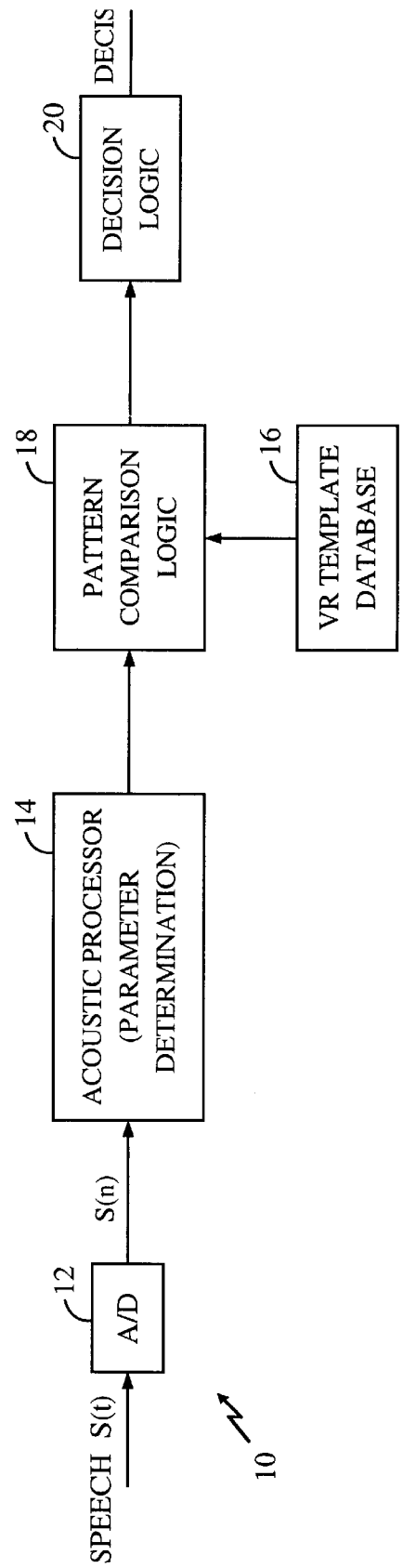
FIG. 1 is a block diagram of a voice recognition system.

In accordance with one embodiment, as illustrated in FIG. 1, a voice recognition system 10 includes an analog-to-digital converter (A/D) 12, an acoustic processor 14, a VR template database 16, pattern comparison logic 18, and decision logic 20. The VR system 10 may reside in, e.g., a wireless telephone or a hands-free car kit.

When the VR system 10 is in speech recognition phase, a person (not shown) speaks a word or phrase, generating a speech signal. The speech signal is converted to an electrical speech signal s(t) with a conventional transducer (also not shown). The speech signal s(t) is provided to the A/D 12, which converts the speech signal s(t) to digitized speech samples s(n) in accordance with a known sampling method such as, e.g., pulse coded modulation (PCM).

The speech samples s(n) are provided to the acoustic processor 14 for parameter determination. The acoustic processor 14 produces a set of extracted parameters that models the characteristics of the input speech signal s(t). The parameters may be determined in accordance with any of a number of known speech parameter determination techniques including, e.g., speech coder encoding and using fast fourier transform (FFT)-based cepstrum coefficients, as described in the aforementioned U.S. Pat. No. 5,414,796. The acoustic processor 14 may be implemented as a digital signal processor (DSP). The DSP may include a speech coder. Alternatively, the acoustic processor 14 may be implemented as a speech coder.

Parameter determination is also performed during training of the VR system 10, wherein a set of templates for all of the vocabulary words of the VR system 10 is routed to the VR template database 16 for permanent storage therein. The VR template database 16 is advantageously implemented as any conventional form of nonvolatile storage medium, such as, e.g., flash memory. This allows the templates to remain in the VR template database 16 when the power to the VR system 10 is turned off.

The set of parameters is provided to the pattern comparison logic 18. The pattern comparison logic 18 advantageously detects the starting and ending points of an utterance, computes dynamic acoustic features (such as, e.g., time derivatives, second time derivatives, etc.), compresses the acoustic features by selecting relevant frames, and quantizes the static and dynamic acoustic features. Various known methods of endpoint detection, dynamic acoustic feature derivation, pattern compression, and pattern quantization are described in, e.g., Lawrence Rabiner & Biing-Hwang Juang, *Fundamentals of Speech Recognition* (1993), which is fully incorporated herein by reference.

The pattern comparison logic 18 compares the set of parameters to all of the templates stored in the VR template database 16. The comparison results, or distances, between the set of parameters and all of the templates stored in the VR template database 16 are provided to the decision logic 20. The decision logic 20 may (1) select from the VR template database 16 the template that most closely matches the set of parameters, or may (2) apply an "N-best" selection algorithm, which chooses the N closest matches within a predefined matching threshold; or may (3) reject the set of parameters. If an N-best algorithm is used, the person is then queried as to which choice was intended. The output of the decision logic 20 is the decision as to which word in the vocabulary was spoken. For example, in an N-best situation, the person might say, "John Anders," and the VR system 10 might reply, "Did you say John Andrews?" The person would then reply, "John Anders." The VR system 10 might then reply, "Did you say John Anders?" The person would then reply, "Yes," at which point the VR system 10 would initiate dialing of a telephone call.

The pattern comparison logic 18 and the decision logic 20 may advantageously be implemented as a microprocessor. Alternatively, the pattern comparison logic 18 and the decision logic 20 may be implemented as any conventional form of processor, controller, or state machine. The VR system 10 may be, e.g., an application specific integrated circuit (ASIC). The recognition accuracy of the VR system 10 is a measure of how well the VR system 10 correctly recognizes spoken words or phrases in the vocabulary. For example, a recognition accuracy of 95% indicates that the VR system 10 correctly recognizes words in the vocabulary ninety-five times out of 100.

Figure 2:
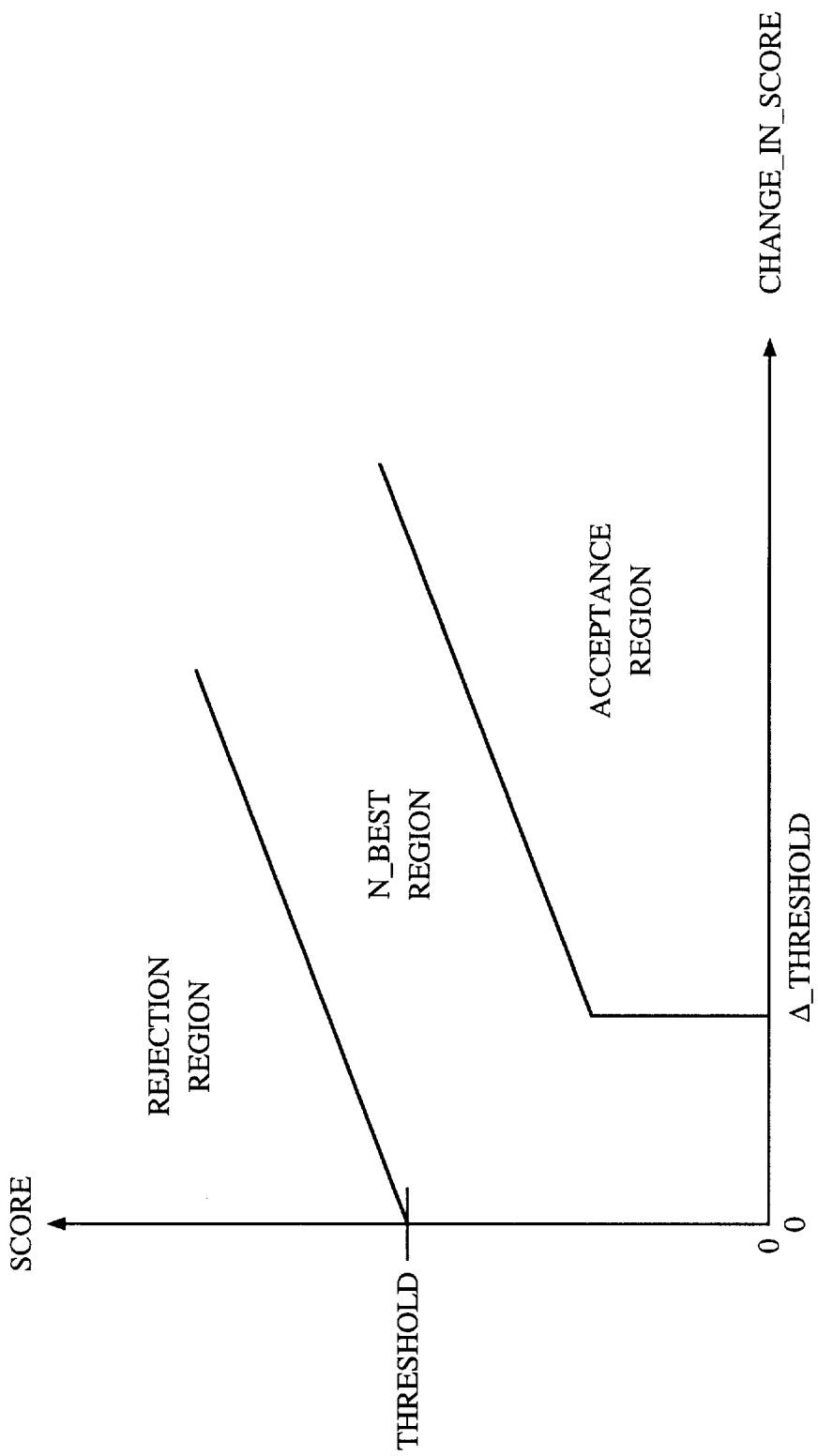
FIG. 2 is a graph of score versus change in score for a rejection scheme of a VR system, illustrating rejection, N-best, and acceptance regions.

In one embodiment a graph of score versus change in score is segmented into regions of acceptance, N-best, and rejection, as illustrated in FIG. 2. The regions are separated by lines in accordance with known linear discriminative analysis techniques, which are described in Richard O. Duda & Peter E. Hart, *Pattern Classification and Scene Analysis* (1973), which is fully incorporated herein by reference. Each utterance input to the VR system 10 is assigned a comparison result for, or distance from, every template stored in the VR template database 16 by the pattern comparison logic 18, as described above. These distances, or "scores," may advantageously be Euclidean distances between vectors in an N-dimensional vector space, summed over multiple frames. In one embodiment the vector space is a twenty-four-dimensional vector space, the score is cumulated over twenty frames, and the score is an integer distance. Those skilled in the art would understand that the score could equally well be expressed as a fraction or other value. Those skilled in the art would also understand that other metrics may be substituted for Euclidean distances, such that the scores could be, e.g., probability measures, likelihood measures, etc.

For a given utterance and a given VR template from the VR template database 16, the lower the score (i.e., the smaller the distance between the utterance and the VR template), the closer the match between the utterance and the VR template. For each utterance, the decision logic 20 analyzes the score associated with the closest match in the VR template database 16 in relation to the difference between that score and the score associated with the second-closest match in the VR template database 16 (i.e., the second-lowest score). As depicted in the graph of FIG. 2, "score" is plotted against "change in score" and three regions are defined. The rejection region represents an area in which a score is relatively high and the difference between that score and the next-lowest score is relatively small. If an utterance falls within the rejection region, the decision logic 20 rejects the utterance. The acceptance region represents an area in which a score is relatively low and the difference between that score and the next-lowest score is relatively large. If an utterance falls within the acceptance region, the decision logic 20 accepts the utterance. The N-best region lies between the rejection region and the acceptance region. The N-best region represents an area in which either a score is less than a score in the rejection region or the difference between that score and the next-lowest score is greater than the difference for a score in the rejection region. The N-best region also represents an area in which either a score is greater than a score in the acceptance region or the difference between that score and the next-lowest score is less than the difference for a score in the acceptance region, provided the difference for the score in the N-best region is greater than a predefined threshold change-in-score value. If an utterance falls within the N-best region, the decision logic 20 applies an N-best algorithm to the utterance, as described above.

In the embodiment described with reference to FIG. 2, a first line segment separates the rejection region from the N-best region. The first line segment intersects the "score" axis at a predefined threshold score value. The slope of the first line segment is also predefined. A second line segment separates the N-best region from the acceptance region. The slope of the second line segment is predefined as being the same as the slope of the first line segment, so that the first and second line segments are parallel. A third line segment extends vertically from a predefined threshold change value on the "change in score" axis to meet an endpoint of the second line segment. It would be appreciated by those of skill in the art that the first and second line segments need not be parallel, and could have any arbitrarily assigned slopes. Moreover, the third line segment need not be used.

In one embodiment the threshold score value is 375, the threshold change value is 28, and if the endpoint of the second line segment were extended, the second line segment would intersect the "score" axis at the value 250, so that the slopes of the first and second line segments are each 1. If the score value is greater than the change-in-score value plus 375, the utterance is rejected. Otherwise, if either the score value is greater than the change-in-score value plus 250 or the change-in-score value is less than 28, an N-best algorithm is applied to the utterance. Otherwise, the utterance is accepted.

In the embodiment described with reference to FIG. 2, two dimensions are used for the linear discriminative analysis. The dimension "score" represents the distance between a given utterance and a given VR template, as derived from the outputs of multiple bandpass filters (not shown). The dimension "change in score" represents the difference between the lowest score, i.e., the closest-matched score, and the next-lowest score, i.e., the score for the next-closest-matched utterance. In another embodiment the dimension "score" represents the distance between a given utterance and a given VR template, as derived from the cepstral coefficients of the utterance. In another embodiment the dimension "score" represents the distance between a given utterance and a given VR template, as derived from the linear predictive coding (LPC) coefficients of the utterance. Techniques for deriving the LPC coefficients and the cepstral coefficients of an utterance are described in the aforementioned U.S. Pat. No. 5,414,796.

In alternate embodiments the linear discriminative analysis is not restricted to two dimensions. Accordingly, a first score based upon bandpass filter outputs, a second score based upon cepstral coefficients, and a change in score are analyzed in relation to each other. Alternatively, a first score based upon bandpass filter outputs, a second score based upon cepstral coefficients, a third score based upon LPC coefficients, and a change in score are analyzed in relation to each other. As those skilled in the art could readily appreciate, the number of dimensions for "score" need not be restricted to any particular number. Those of skill could appreciate that the number of score dimensions is limited only by the number of words in the vocabulary of the VR system. Those of skill would also appreciate that the types of scores used need not be limited to any particular type of score, but may include any scoring method known in the art. Further, and also readily appreciable by those of skill in the art, the number of dimensions for "change in score" need not be restricted to one, or to any particular number. For example, in one embodiment a score is analyzed in relation to a change in score between the closest match and the next-closest match, and the score is also analyzed in relation to a change in score between the closest match the third-closest match. Those of skill could appreciate that the number of change-in-score dimensions is limited only by the number of words in the vocabulary of the VR system.

Thus, a novel and improved voice recognition rejection scheme based on linear discriminative analysis has been described. Those of skill in the art would understand that the various illustrative logical blocks and algorithm steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of capturing an utterance in a voice recognition system, comprising the steps of:
    comparing the utterance to a first stored word to generate a first score;
    comparing the utterance to a second stored word to generate a second score;
    determining a difference between the first score end the second score;
    determining a ratio of the first score to the difference; and
    processing the utterance based on the ratio.

2. The method of claim 1, further comprising:
    if the ratio of the first score to the difference is within a first range of values, accepting the utterance;
    if the ratio of the first score to the difference is within a second range of values, applying an N-best algorithm to verify the utterance; and
    if the ratio of the first score to the difference is within a third range of values, rejecting the utterance.

3. The method of claim 1, wherein the difference corresponds to a change of score between the first score and the second score.

4. The method of claim 1, wherein the first stored word comprises a best candidate in a vocabulary of a voice recognition system, and the second stored word comprises a next-best candidate in a vocabulary of a voice recognition system.

5. The method of claim 1, wherein the first score comprises a closest comparison result, and the second score comprises a next-closest comparison result.

6. The method of claim 1, wherein the first score and the second score comprise linear predictive coding coefficients.

7. The method of claim 1, wherein the first score and the second score comprise cepstral coefficients.

8. The method of claim 1, wherein the first score and the second score comprise bandpass filter outputs.

9. The method of claim 2, wherein the first, second, and third range of values define linear relationships between the first score and the difference.

10. The method of claim 1, wherein the difference comprises a difference between a closest comparison result and a next-closest comparison result.

11. A voice recognition system, comprising:
    an acoustic processor configured to extract speech parameters from digitized speech samples of an utterance; and
    a processor coupled to the acoustic processor and configured to compare the utterance to a first stored word to generate a first score;
    compare the utterance to a second stored word to generate a second score;
    determine a difference between the first score and the second score;
    determine a ratio of the first score to the difference; and
    process the utterance based on the relationship.

12. The voice recognition system of claim 11, wherein the processor is further configured to:
    accept the utterance if the ratio of the first score to the difference is within a first range of values;
    apply an N-best algorithm to verify the utterance if the ratio of the first score to the difference is within a second range of values; and
    reject the utterance if the ratio of the first score to the difference is within a third range of values, rejecting the utterance.

13. The voice recognition system of claim 11, wherein the difference corresponds to a change of score between the first score and the second score.

14. The voice recognition system of claim 11, wherein the first stored word comprises a best candidate in a vocabulary of the voice recognition system, and the second stored word comprises a next-best candidate in a vocabulary of the voice recognition system.

15. The voice recognition system of claim 11, wherein the first score comprises a closest comparison result, and the second score comprises a next-closest comparison result.

16. The voice recognition system of claim 11, wherein the first and the second score comprise linear predictive coding coefficients.

17. The voice recognition system of claim 11, wherein the first score and the second score comprise cepstral coefficients.

18. The voice recognition system of claim 11, wherein the first score and the second score comprise bandpass filter outputs.

19. The voice recognition system of claim 12, wherein the first, second, and third range of values define linear relationships between the first score and the difference.

20. The voice recognition system of claim 11, wherein the difference comprises a difference between a closest comparison result and a next-closest comparison result.

21. A voice recognition system, comprising:
    means for comparing the utterance to a first stored word to generate a first score;
    means for comparing the utterance to a second stored word to generate a second score;
    means for determining a difference between the first score and the second score;
    means for determining a ratio of the first score to the difference; and
    means for processing the utterance based on the relationship.

22. The voice recognition system of claim 21, further comprising:
    means for accepting the utterance if the ratio of the first score to the difference is within a first range of values;
    means for applying an N-best algorithm to verify the utterance if the ratio of the first score to the difference is within a second range of values; and
    means for rejecting the utterance if the ratio of the first score to the difference is within a third range of values, rejecting the utterance.

23. The voice recognition system of claim 22, wherein the first, second, and third range of values define linear relationships between the first score and the difference.

24. The voice recognition system of claim 21, wherein the difference corresponds to a change of score between the first score and the second score.

25. The voice recognition system of claim 21, wherein the first stored word comprises a best candidate in a vocabulary of the voice recognition system, and the second stored word comprises a next-best candidate in a vocabulary of the voice recognition system.

26. The voice recognition system of claim 21, wherein the first score comprises a closest comparison result, and the second comprises a next-closest comparison result.

27. The voice recognition system of claim 21, wherein the first score and the second comprise linear predictive coding coefficients.

28. The voice recognition system of claim 21, wherein the first score and the second score comprise cepstral coefficients.

29. The voice recognition system of claim 21, wherein the first score and the second score comprise bandpass filter outputs.

30. The voice recognition system of claim 21, wherein difference comprises a difference between a closest comparison result and a next-closest comparison result.

31. A voice recognition system, comprising:
   means for extracting speech parameters from digitized speech samples of an utterance; and
   means for:
      comparing the utterance to a first stored word to generate a first score;
      comparing the utterance to a second stored word to generate a second score;
      determining a difference between the first score and the second score;
      determining a ratio of the first score to the difference; and
      processing the utterance based on the relationship.

32. The voice recognition system of claim 31, further comprising means for:
   accepting the utterance if the ratio of the first score to the difference is within a first range of values;
   applying an N-best algorithm to verify the utterance if the ratio of the first score to the difference is within a second range of values; and
   rejecting the utterance if the ratio of the first score to the difference is within a third range of values, rejecting the utterance.

33. The voice recognition system of claim 31, wherein the difference comprises a difference between a closest comparison result and a next-closest comparison result.

34. The voice recognition system of claim 31, wherein the difference corresponds to a change of score between the first score and the second score.

35. The voice recognition system of claim 31, wherein the first stored word comprises a best candidate in a vocabulary of the voice recognition system, and the second stored word comprises a next-best candidate in a vocabulary of the voice recognition system.

36. The voice recognition system of claim 31, wherein the first score comprises a closest comparison result, and the second score comprises a next-closest comparison result.

37. The voice recognition system of claim 31, wherein the first score and the second score comprise linear predictive coding coefficients.

38. The voice recognition system of claim 31, wherein the first score and the second score comprise cepstral coefficients.

39. The voice recognition system of claim 31, wherein the first score and the second score comprise bandpass filter outputs.

40. The voice recognition system of claim 32, wherein the first, second, and third range of values define linear relationships between the first score and the difference.

* * * * *

UNITED STATES PATENT AND TRADEMARK OFFICE
CERTIFICATE OF CORRECTION

| | |
|---|---|
| PATENT NO. | : 6,574,596 B2 |
| APPLICATION NO. | : 09/248513 |
| DATED | : June 3, 2003 |
| INVENTOR(S) | : Bi et al. |

It is certified that error appears in the above-identified patent and that said Letters Patent is hereby corrected as shown below:

Column 7, line 28, change "first score end" to --first score and--.

Signed and Sealed this

Nineteenth Day of December, 2006

JON W. DUDAS
*Director of the United States Patent and Trademark Office*